(12) United States Patent
Kienzle et al.

(10) Patent No.: US 9,571,372 B1
(45) Date of Patent: Feb. 14, 2017

(54) SYSTEMS AND METHODS FOR ESTIMATING AGES OF NETWORK DEVICES

(71) Applicant: Symantec Corporation, Mountain View, CA (US)

(72) Inventors: Darrell Kienzle, Vienna, VA (US); Nathan Evans, Sterling, VA (US); Matthew Elder, Germantown, MD (US)

(73) Assignee: Symantec Corporation, Mountain View, CA (US)

( * ) Notice: Subject to any disclaimer, the term of this patent is extended or adjusted under 35 U.S.C. 154(b) by 485 days.

(21) Appl. No.: 13/749,667

(22) Filed: Jan. 24, 2013

(51) Int. Cl.
| G06F 15/16 | (2006.01) |
| G06F 15/173 | (2006.01) |
| H04L 12/26 | (2006.01) |

(52) U.S. Cl.
CPC .................................. *H04L 43/10* (2013.01)

(58) Field of Classification Search
CPC ...... H04L 67/141; H04L 63/08; H04L 65/403; H04L 67/02; H04L 65/1006; H04L 67/10; H04L 12/189; H04L 29/06455; H04L 47/806; H04L 49/201
USPC .................................. 709/224, 223; 726/13
See application file for complete search history.

(56) References Cited

U.S. PATENT DOCUMENTS

| 6,535,227 | B1* | 3/2003 | Fox et al. ...................... 709/223 |
| 7,031,950 | B2* | 4/2006 | Darken et al. .................. 706/21 |
| 7,401,120 | B2* | 7/2008 | Walbeck et al. ............... 709/203 |
| 7,599,995 | B1* | 10/2009 | Fernandez et al. ........... 709/206 |
| 7,774,824 | B2* | 8/2010 | Ross ................................. 726/2 |
| 8,271,790 | B2* | 9/2012 | Rosenan et al. ............... 713/176 |
| 8,285,705 | B2* | 10/2012 | Waters et al. ................. 709/224 |
| 8,297,520 | B1* | 10/2012 | Wakerly et al. ............... 235/492 |
| 8,578,468 | B1* | 11/2013 | Yadav ..................... H04L 63/08 713/154 |
| 8,788,655 | B2* | 7/2014 | Dare et al. ..................... 709/224 |
| 8,819,498 | B2* | 8/2014 | Gearing et al. ............. 714/47.3 |
| 8,844,041 | B1* | 9/2014 | Kienzle et al. ............... 709/224 |

(Continued)

FOREIGN PATENT DOCUMENTS

WO     WO 2005036360 A2 *   4/2005

OTHER PUBLICATIONS

WBM, Nov. 24, 2010, web.archive.org/web/20101124143818/http://standards.ieee.org/develop/regauth.oui/oui.txt, archive.org, 2-pages.*

(Continued)

*Primary Examiner* — Kevin Bates
*Assistant Examiner* — Emad Siddiqi
(74) *Attorney, Agent, or Firm* — Fisherbroyles LLP

(57) ABSTRACT

A computer-implemented method for estimating ages of network devices may include (1) identifying at least one networked device that may be attached to a network, (2) identifying a media access control address of the networked device, the media access control address comprising an organizational unique identifier, (3) querying an organizational-unique-identifier database with the organizational unique identifier and receiving, in response, device-age information relating to an estimated age of the networked device and (4) determining the estimated age of the networked device based at least in part on the device-age information. Various other methods, systems, and computer-readable media are also disclosed.

18 Claims, 6 Drawing Sheets

(56) References Cited

U.S. PATENT DOCUMENTS

| | | | |
|---|---|---|---|
| 2004/0064550 A1* | 4/2004 | Sakata et al. | 709/224 |
| 2007/0067435 A1* | 3/2007 | Landis et al. | 709/224 |
| 2007/0206512 A1* | 9/2007 | Hinds | H04L 41/12 370/254 |
| 2008/0052384 A1* | 2/2008 | Marl et al. | 709/223 |
| 2008/0270198 A1* | 10/2008 | Graves | G06Q 10/06 705/7.12 |
| 2008/0271110 A1* | 10/2008 | Graves | G06Q 10/10 726/1 |
| 2009/0235354 A1* | 9/2009 | Gray et al. | 709/224 |
| 2009/0319848 A1* | 12/2009 | Thaper | 714/748 |
| 2011/0010518 A1* | 1/2011 | Kavuri et al. | 711/165 |
| 2011/0302629 A1* | 12/2011 | Whitson et al. | 726/3 |
| 2012/0131211 A1* | 5/2012 | Schemitsch | 709/228 |
| 2012/0297050 A1* | 11/2012 | Frank | H04L 41/147 709/224 |
| 2013/0086411 A1* | 4/2013 | Bauer | G06F 11/3051 714/3 |
| 2013/0275575 A1* | 10/2013 | Hugard et al. | 709/224 |
| 2013/0275751 A1* | 10/2013 | Fink et al. | 713/162 |
| 2013/0317905 A1* | 11/2013 | Warner | G06Q 30/02 705/14.49 |
| 2013/0346629 A1* | 12/2013 | Wang et al. | 709/245 |
| 2014/0101467 A1* | 4/2014 | Jubran et al. | 709/220 |
| 2014/0122500 A1* | 5/2014 | Burkard et al. | 707/748 |

OTHER PUBLICATIONS

William Gauvin et al.; Detecting Network Devices and Mapping Topology Using Network Introspection by Collaboration Endpoints; U.S. Appl. No. 12/713,606, filed Feb. 26, 2010.

Darrell Kienzle et al.; Systems and Methods for Discovering Network Topologies; U.S. Appl. No. 13/660,574, filed Oct. 25, 2012.

Darrell Kienzle et al.; Systems and Methods for Mapping Network Topologies; U.S. Appl. No. 13/043,038, filed Mar. 8, 2011.

* cited by examiner

SYSTEMS AND METHODS FOR ESTIMATING AGES OF NETWORK DEVICES

GOVERNMENT LICENSE RIGHTS

This Invention was made with Government support under FA8750-10-9-0110 awarded by Air Force Research Laboratory/RIKE, Rome Research Site, 26 Electronic Parkway, Rome, N.Y. 13441. The Government has certain rights in the Invention.

BACKGROUND

Consumers and organizations may spend a considerable amount of resources configuring and troubleshooting local area networks ("LANs"). In many cases, consumers and organizations may wish to discover details about the topology of their LANs in order to more efficiently configure, troubleshoot, and/or maintain their LANs. For example, organizations may wish to ensure that any devices connected to a LAN are authorized, compliant with specified policies, properly configured, etc.

Traditional systems for risk management, compliance, and vulnerability detection may require certain types of authorization and/or access to devices on a LAN to gather information about the devices. Unfortunately, in some cases obtaining and/or coordinating such access may prove difficult and/or impractical. Furthermore, the device information that these traditional systems do gather may provide an incomplete picture, where more details about devices attached to the network may facilitate the administration of the network and the attached devices. Accordingly, the instant disclosure identifies and addresses a need for additional and improved systems and methods for estimating ages of network devices.

SUMMARY

As will be described in greater detail below, the instant disclosure generally relates to systems and methods for estimating ages of network devices by capturing the Media Access Control ("MAC") addresses of network devices, extracting Organizational Unique Identifiers ("OUIs") from the MAC addresses, and estimating the ages of the network devices based on the OUIs of the network devices' MAC addresses (e.g., by determining when the OUIs were assigned).

In one example, a computer-implemented method for estimating ages of network devices may include (1) identifying at least one networked device that may be attached to a network, (2) identifying a media access control address of the networked device, the media access control address comprising an organizational unique identifier, (3) querying an organizational-unique-identifier database with the organizational unique identifier and receiving, in response, device-age information relating to an estimated age of the networked device and (4) determining the estimated age of the networked device based at least in part on the device-age information.

In one embodiment, the device-age information may indicate when the organizational unique identifier was assigned to an organization.

In some examples, determining the estimated age of the networked device based at least in part on the device-age information may include determining that an existence of the networked device does not precede when the organizational unique identifier was assigned to the organization.

In some examples, the computer-implemented method may include performing a security scan on the networked device based at least in part on the estimated age of the networked device.

In one embodiment, the computer-implemented method may also include (1) configuring a security scan of the networked device with an old-device rule based at least in part on the estimated age of the networked device and (2) performing the security scan on the networked device.

In one embodiment, the computer-implemented method may also include (1) identifying a compliance policy to which the networked device may be subject and (2) determining that the networked device may be not compliant with the compliance policy based at least in part on the estimated age of the networked device.

In one embodiment, the computer-implemented method may also include (1) determining, based on the estimated age of the networked device, that the networked device may be due for replacement and (2) alerting an administrator of the network that the networked device may be due for replacement.

In one embodiment, a system for implementing the above-described method may include (1) an identification module programmed to (i) identify at least one networked device that may be attached to a network and (ii) identify a media access control address of the networked device, the media access control address comprising an organizational unique identifier, (2) a querying module programmed to query an organizational-unique-identifier database with the organizational unique identifier and receive, in response, device-age information relating to an estimated age of the networked device, (3) a determination module programmed to determine the estimated age of the networked device based at least in part on the device-age information and (4) at least one processor configured to execute the identification module, the querying module and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify at least one networked device that may be attached to a network, (2) identify a media access control address of the networked device, the media access control address comprising an organizational unique identifier, (3) query an organizational-unique-identifier database with the organizational unique identifier and receiving, in response, device-age information relating to an estimated age of the networked device and (4) determine the estimated age of the networked device based at least in part on the device-age information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
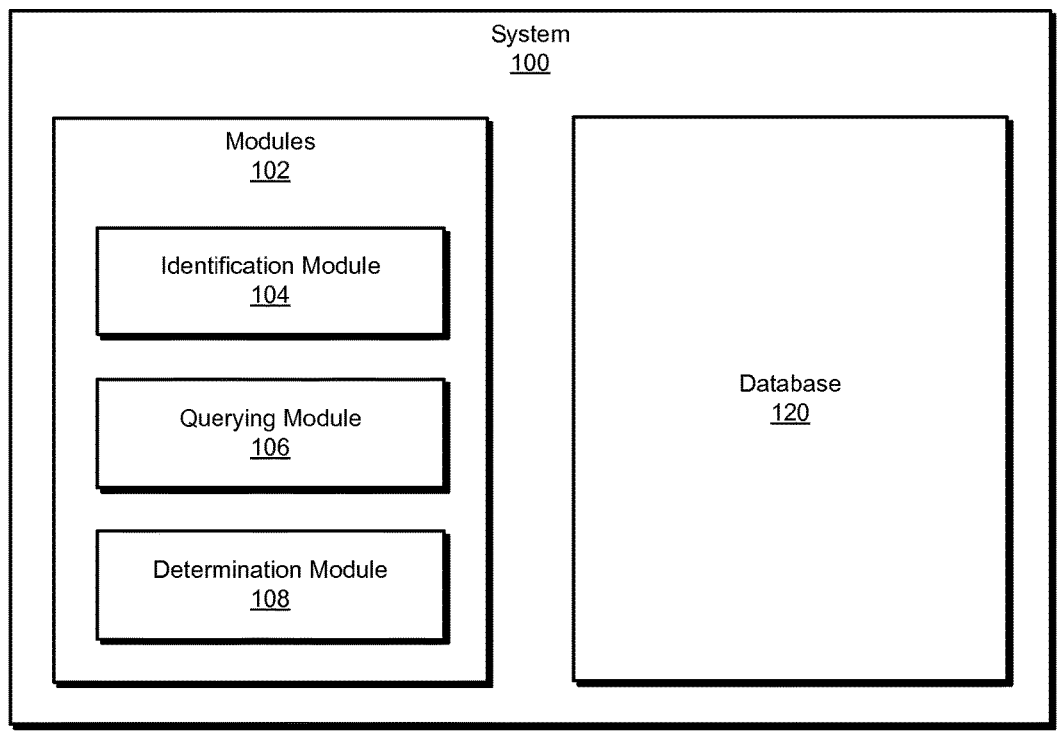
FIG. 1 is a block diagram of an exemplary system for estimating ages of network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for estimating ages of network devices. As will be explained in greater detail below, by capturing the MAC addresses of network devices, extracting OUIs from the MAC addresses, and estimating the ages of the network devices based on the OUIs of the network devices' MAC addresses, the systems and methods described herein may provide information about devices connected to a network. In some examples, these systems and methods may operate successfully even where access to devices is limited and/or difficult to coordinate (e.g., by extracting MAC addresses from network packets, these systems and methods may collect information without requiring intrusive agents and/or scans of devices).

Figure 2:
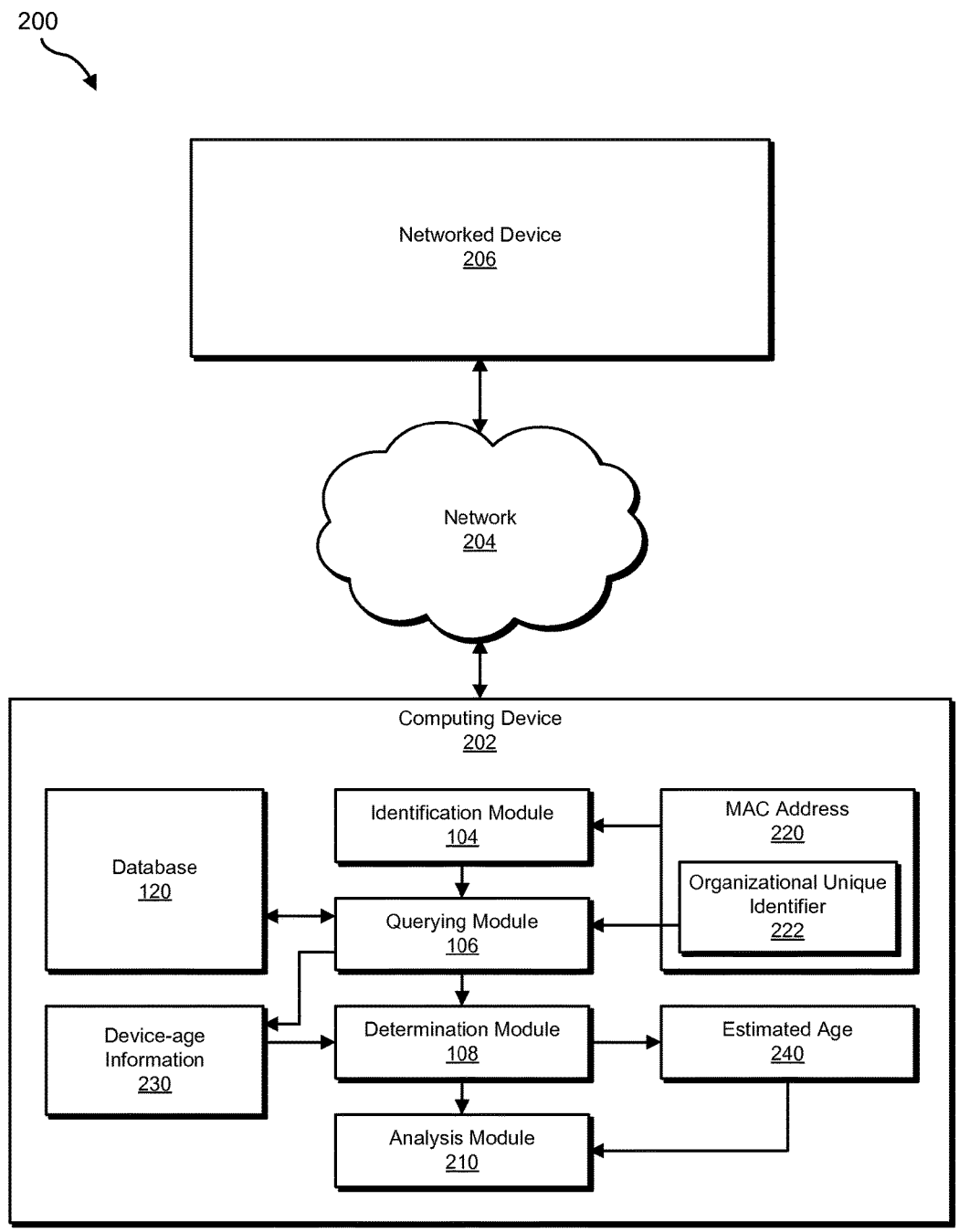
FIG. 2 is a block diagram of an exemplary system for estimating ages of network devices.

The following will provide, with reference to FIGS. 1-2, detailed descriptions of exemplary systems for estimating ages of network devices. Detailed descriptions of corresponding computer-implemented methods will also be provided in connection with FIG. 3. Detailed descriptions of an exemplary network will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for estimating ages of network devices. As illustrated in this figure, exemplary system 100 may include one or more modules 102 for performing one or more tasks. For example, and as will be explained in greater detail below, exemplary system 100 may also include an identification module 104 programmed to 1) identify at least one networked device that is attached to a network and 2) identify a media access control address of the networked device, the media access control address comprising an organizational unique identifier. Exemplary system 100 may additionally include a querying module 106 programmed to query an organizational-unique-identifier database with the organizational unique identifier and receive, in response, device-age information relating to an estimated age of the networked device. Exemplary system 100 may also include a determination module 108 programmed to determine the estimated age of the networked device based at least in part on the device-age information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or one or more devices within network 204), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data that maps organizational unique identifiers to estimated device ages (e.g., by storing data indicating when organizational unique identifiers were assigned).

Database 120 may represent portions of a single database or computing device or a plurality of databases or computing devices. For example, database 120 may represent a portion of computing device 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a networked device 206 via a network 204. Computing device 202 may be programmed with one or more of modules 102 and/or may store all or a portion of the data in database 120. Additionally or alternatively, networked device 206 may be programmed with one or more of modules 102 and/or may store all or a portion of the data in database 120.

In one embodiment, one or more of modules 102 from FIG. 1 may, when executed by at least one processor of computing device 202 and/or networked device 206, facilitate computing device 202 and/or networked device 206 in estimating ages of network devices. For example, and as will be described in greater detail below, one or more of modules 102 may cause computing device 202 to estimate the age of networked device 206. For example, and as will be described in greater detail below, identification module 104 may be programmed to identify networked device 206 attached to a network 204. Identification module 104 may also be programmed to identify a media access control address 220 of networked device 206, media access control address 220 including an organizational unique identifier 222. Querying module 106 may be programmed to query an organizational-unique-identifier database 120 with organizational unique identifier 222 and receive, in response, device-age information 230 relating to an estimated age 240 of networked device 206. Determination module 108 may be programmed to determine estimated age 240 of networked device 206 based at least in part on device-age information 230.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Networked device 206 generally represents any type or form of computing device that is capable of connecting to a network and/or any computing device with a MAC address. Examples of networked device 206 include, without limitation, application servers and database servers configured to provide various database services and/or run certain software applications, host computing systems, end-user computing systems, printers, storage arrays, and switches.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and networked device 206.

Figure 3:
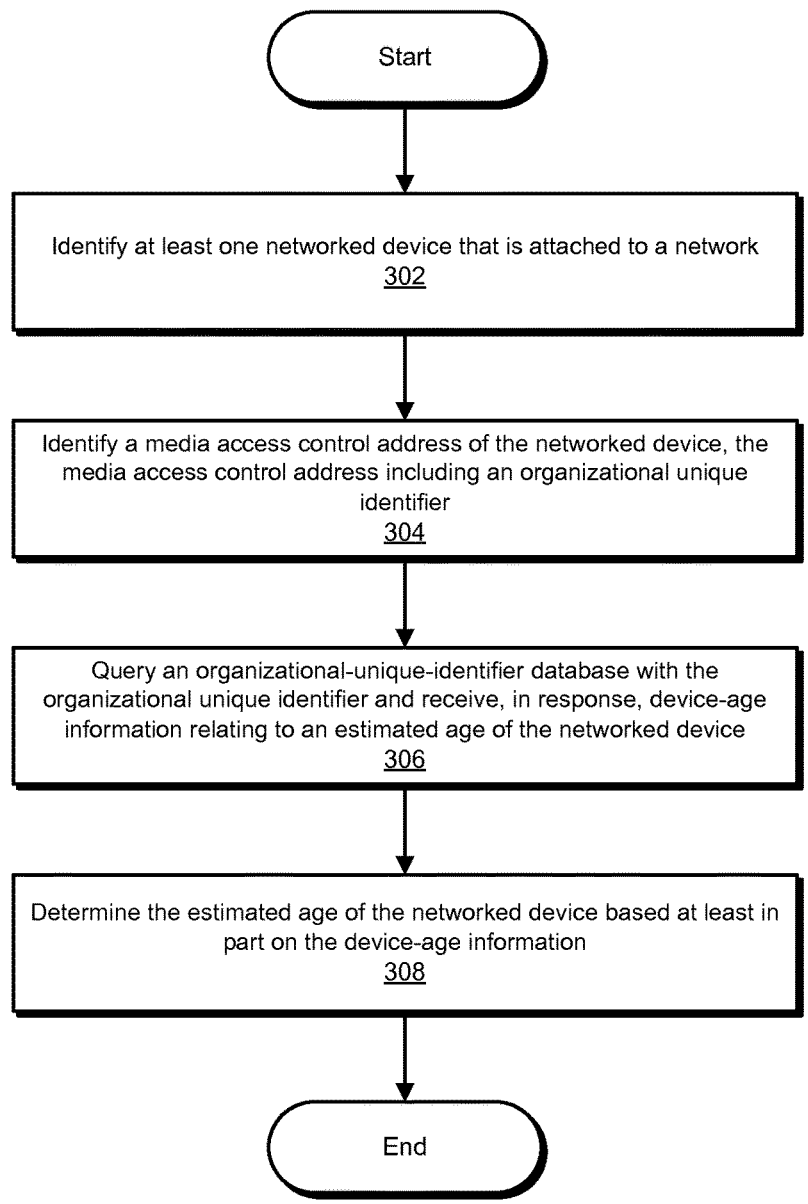
FIG. 3 is a flow diagram of an exemplary method for estimating ages of network devices.

FIG. 3 is a flow diagram of an exemplary computer-implemented method 300 for estimating ages of network devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify at least one networked device that is attached to a network. For example, at step 302 identification module 104 may, as part of computing device 202 in FIG. 2, identify networked device 206 attached to network 204.

As used herein, the phrase "networked device" may refer to any device that is capable of connecting to a network and/or any computing device with a MAC address. Examples of networked devices include, without limitation, host systems, end-user client systems, printers, storage arrays, and switches.

Identification module 104 may identify the networked device in any of a variety of contexts. For example, identification module 104 may identify the networked device while scanning the network to determine a topology of the network (e.g., to identify a list of devices that constitute and/or are connected to the network and/or to identify how these devices are interconnected). In some examples, as will be explained in greater detail below, identification module 104 may identify the networked device by identifying network traffic on the network which is directed to or from the networked device. For example, identification module 104 may identify the networked device by identifying the MAC address of the networked device.

Figure 4:
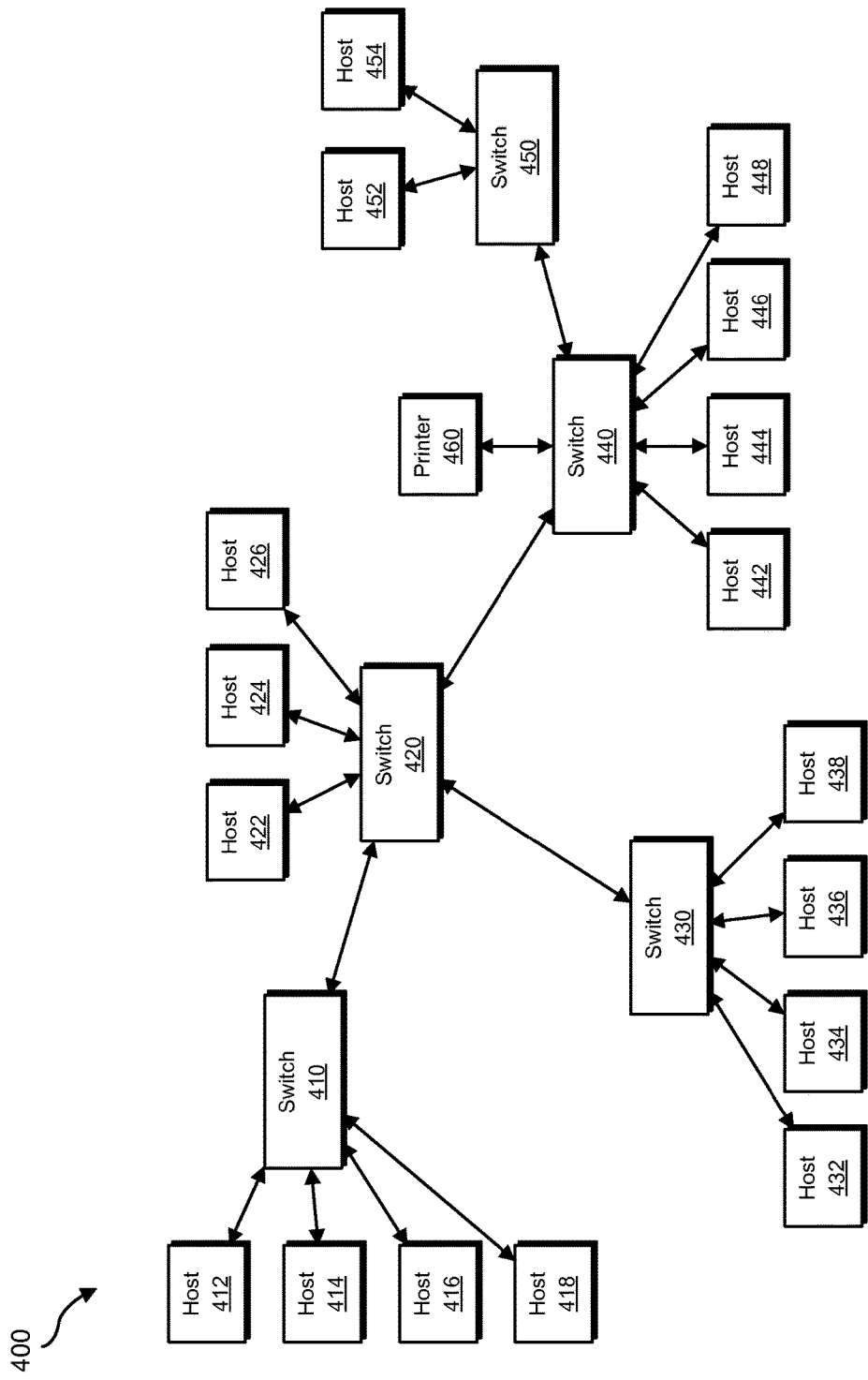
FIG. 4 is a block diagram of an exemplary network.

FIG. 4 is a block diagram of an exemplary network 400. As shown in FIG. 4, network 400 may include switches 410, 420, 430, 440, and 450 connecting hosts 412, 414, 416, 418, 422, 424, 426, 432, 434, 436, 438, 442, 444, 446, 448, 452, and 454 and a printer 460. In one example, identification module 104 may identify host 422 on network 400 (e.g., as part of an effort to map the topology of network 400).

Returning to FIG. 3, at step 304 one or more of the systems described herein may identify a media access control address of the networked device, the media access control address comprising an organizational unique identifier. For example, at step 304 identification module 104 may, as part of computing device 202 in FIG. 2, identify a media access control address 220 of networked device 206, media access control address 220 including an organizational unique identifier 222.

As used herein, the phrase "media access control address" (or "MAC address") may refer to any identifier assigned to a computing device and/or to a networking component and/or interface of a computing device. As used herein, the phrase "organizational unique identifier" may refer to any portion of a MAC address that may be used to determine and/or estimate when the MAC address was allocated, issued, and/or assigned. For example, the phrase "organizational unique identifier" may refer to any portion of a MAC address that identifies an organization and/or entity that issued the MAC address and/or assigned the MAC address to a device. Additionally or alternatively, the organizational unique identifier may be assigned to and/or allocated for an entity without the entity being publicly identified. In this example, the organizational unique identifier may nevertheless represent an assignment of MAC address space that includes and facilitated the use of the MAC address. In some examples, the phrase "MAC address" may refer to an address within an address space managed by the Institute of Electrical and Electronics Engineers ("IEEE"), such as MAC-48, EUI-48, and/or EUI-64. Additionally or alternatively, the phrase "MAC address" may refer to an analogous address within an analogous address space used for comparable purposes (e.g., a network interface address space managed by an alternative organization and/or negotiated by an alternative standard). In some examples, the organizational unique identifier may include the first three octets of a MAC address within the MAC-48 and/or EUI-48 address space. In some examples, the organizational unique identifier may include the first five octets of a MAC address within the EUI-64 address space.

In some examples, identification module 104 may, as a part of identifying the MAC address of the networked device, extract the organizational unique identifier from the MAC address. For example, identification module 104 may extract the three most significant bytes from the MAC address. In some examples, identification module 104 may determine that the MAC address includes an organizational unique identifier by determining that the MAC address includes a flag indicating that the MAC address is universally administered (e.g., as opposed to locally administered).

Identification module 104 may identify the MAC address in any suitable manner. For example, identification module 104 may intercept a network packet sent to the networked device or sent from the networked device and extract the MAC address from the network packet. Additionally or alternatively, identification module 104 may receive a network packet from the networked device including the MAC address. In some examples, identification module 104 may receive a communication from another module and/or application (e.g., an application to map network topographies) that includes the MAC address of the networked device.

Using FIG. 4 as an example, identification module 104 may identify the MAC address of host 422 by intercepting a network packet sent by host 422 on network 400.

Returning to FIG. 3, at step 306 one or more of the systems described herein may query an organizational-unique-identifier database with the organizational unique identifier and receive, in response, device-age information relating to an estimated age of the networked device. For example, at step 306 querying module 106 may, as part of computing device 202 in FIG. 2, query organizational-unique-identifier database 120 with organizational unique identifier 222 and receive, in response, device-age information 230 relating to estimated age 240 of networked device 206.

As used herein, the phrase "organizational-unique-identifier database" (or "OUI database") may refer to any type of database, data structure, look-up table, and/or mapping function that may map and/or that may be used to map one or more OUIs to device-age information. As used herein, the phrase "device-age information" may refer to any data useful for estimating the age of a device with a MAC address that includes a given OUI, such as data identifying an organization to which the OUI was assigned, a date that the OUI was assigned, and/or estimated ages of devices with MAC addresses that include the OUIs.

In some examples, the OUI database may include one or more OUI assignment lists (e.g., published by IEEE) that indicate which OUIs have been assigned. By comparing assignment lists to observe when an OUI was first listed as assigned, querying module 106 may determine an approximate date of assignment of the OUI. In some examples, the OUI database may simply include a lookup table of OUIs to assignment dates and/or estimated device ages. In some examples, querying module 106 may generate the OUI database (e.g., from the OUI assignment lists discussed in the above example). For example, querying module 106 may access OUI assignment lists from an OUI assignor's website (e.g., directly and/or through an Internet caching service such as the INTERNET ARCHIVE WAYBACK MACHINE). In some examples, querying module 106 may monitor for new assignment information to periodically update the OUI database with information about new OUI assignments.

Querying module 106 may query the OUI database in any suitable manner. For example, querying module 106 may query the OUI database with the OUI. Additionally or alternatively, querying module 106 may query the OUI database with the entire MAC address.

Returning to FIG. 3, at step 308 one or more of the systems described herein may determine the estimated age of the networked device based at least in part on the device-age information. For example, at step 308 determination module 108 may, as part of computing device 202 in FIG. 2, determine estimated age 240 of networked device 206 based at least in part on device-age information 230.

Determination module 108 may determine the estimated age of the networked device using the device-age information in any suitable manner. In some examples, the device-age information may include an assignment date of the OUI. In this example, determination module 108 may determine the estimated age of the networked device by estimating determining that the existence of the networked device does not precede when the organizational unique identifier was assigned to the organization (e.g., the assignment date). For example, determination module 108 may determine the estimated age of the networked device by estimating that the networked device was created at the assignment date. Additionally or alternatively, determination module 108 may determine the estimated age of the networked device by estimating that the networked device was created a predefined number of months after the assignment date (e.g., 12 months). In some examples, determination module 108 may determine how far to adjust the assignment date to estimate the age of the networked device based on the assignee of the OUI. For example, determination module 108 may determine (e.g., based on manually-entered data) that a given assignee has an average turnaround of OUI-purchase to new-device-creation of 2 months, and may determine that a different assignee has an average turnaround of OUI-purchase to new-device-creation of 8 months.

In various examples, one or more of the methods described herein may perform and/or configure one or more scans, enforce one or more policies, and/or generate one or more alerts based on the estimated age of the networked device. For example, analysis module 210 may, as a part of computing device 202, perform one or more security and/or policy actions on and/or in relation to networked device 206 based on estimated age 240 of networked device 206.

In some examples, analysis module 210 may perform a security scan on the networked device based at least in part on the estimated age of the networked device. For example, analysis module 210 may determine that the networked device is at risk of one or more vulnerabilities due to the estimated age of the networked device exceeding a predetermined threshold.

In some examples, analysis module 210 may configure a security scan of the networked device with an old-device rule based at least in part on the estimated age of the networked device and then perform the security scan on the networked device. For example, analysis module 210 may configure the security scan with a rule that targets vulnerabilities that are specific to devices that fall within an estimated age range that includes the estimated age of the networked device. Additionally or alternatively, analysis module 210 may configure the security scan of the networked device to be more thorough and/or extensive due to a lower expected baseline security of the networked device in light of the estimated age of the networked device (e.g., thereby allocating resources to the most vulnerable devices and thereby potentially improving network security when a fixed amount of computing resources are allocated to network security).

In some examples, analysis module 210 may identify a compliance policy to which the networked device is subject and determine that the networked device is not compliant with the compliance policy based at least in part on the estimated age of the networked device. For example, the compliance policy may require that a certain class of network devices (to which the networked device belongs) be no more than four years old (e.g., for reasons relating to security, reliability, compatibility, available features, etc.). In some examples, analysis module 210 may disable the networked device and/or block the networked device from the network in response to determining that the networked device is not compliant with the compliance policy.

In some examples, analysis module 210 may determine, based on the estimated age of the networked device, that the networked device is due for replacement and alert an administrator of the network that the networked device is due for replacement. For example, analysis module 210 may determine that a storage device that is more than five years old is due for replacement. In some examples, analysis module 210 may then also perform a data migration from the storage device to an alternative location to prepare for the replacement.

In some examples, analysis module 210 may enhance a network topology report of the network with the estimated age of the networked device. Using FIG. 4 as an example, analysis module 210 may identify a topology of network 400 and label one or more of the elements of network 400 with their respective estimated ages. For example, analysis module 210 may label host 422 as having an estimated age of 28 months, switch 410 as having an estimated age of 46 months, switch 440 as having an estimated age of 52 months, etc.

As explained above in connection with method 300 in FIG. 3, the systems and methods described herein may gather information about devices on a network by capturing the MAC addresses of network devices, extracting OUIs from the MAC addresses, and estimating the ages of the network devices based on the OUIs of the network devices' MAC addresses. In some examples, by relying on observing MAC addresses from transmitted packets, these systems and methods may operate successfully even where access to devices is limited and/or difficult to coordinate. In some examples, these systems and methods may then make decisions about security scans (e.g., how intensive and thorough they should be, what specific vulnerabilities should be targeted) and/or device compliance with existing policies based on the estimated age. In some examples, these systems and methods may provide the estimated age of the devices to an administrator for use in managing the network (e.g., determining when devices should be replaced, troubleshooting with more information available, etc.).

Figure 5:
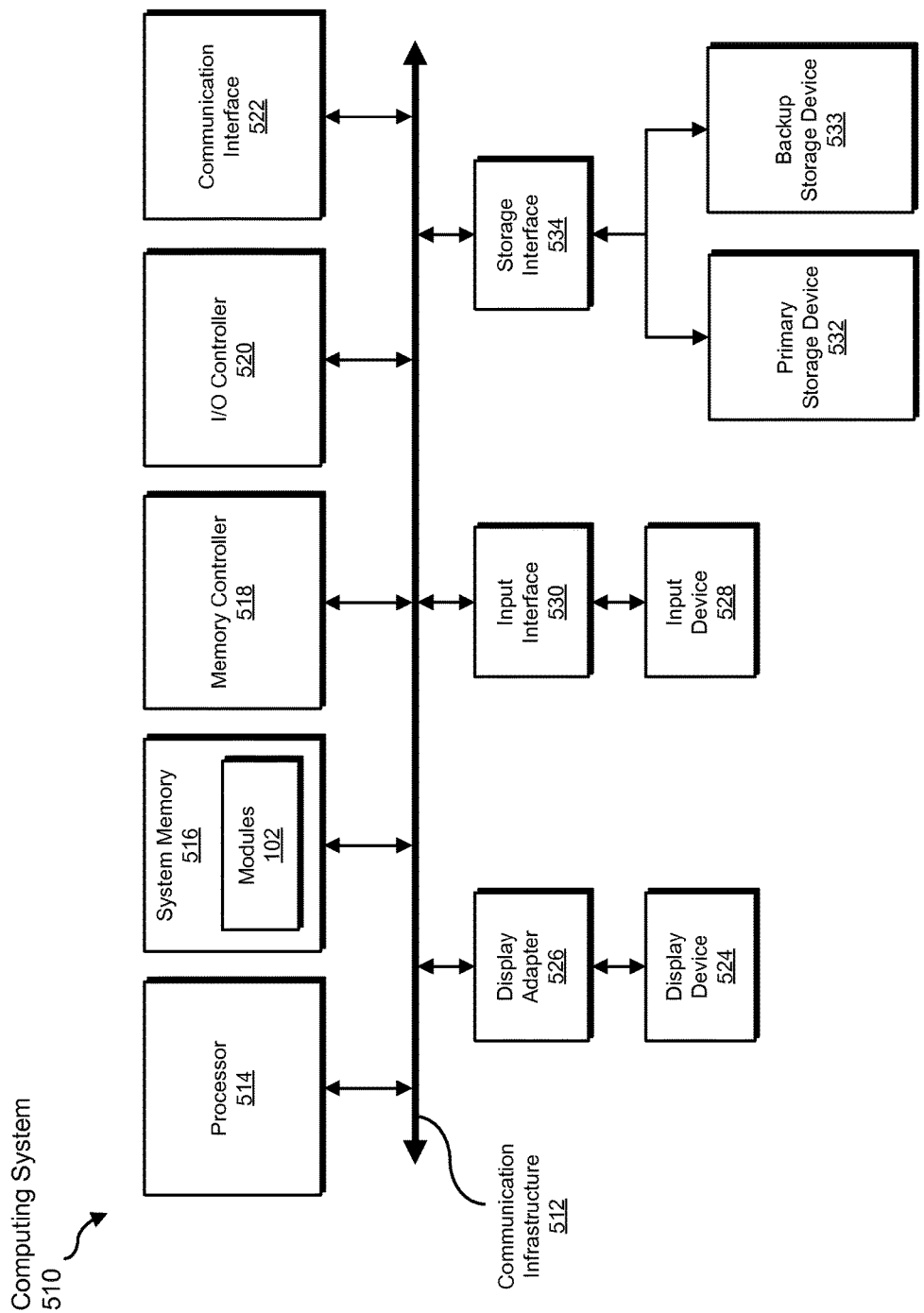
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, querying, determining, performing, configuring, alerting, and/or enhancing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
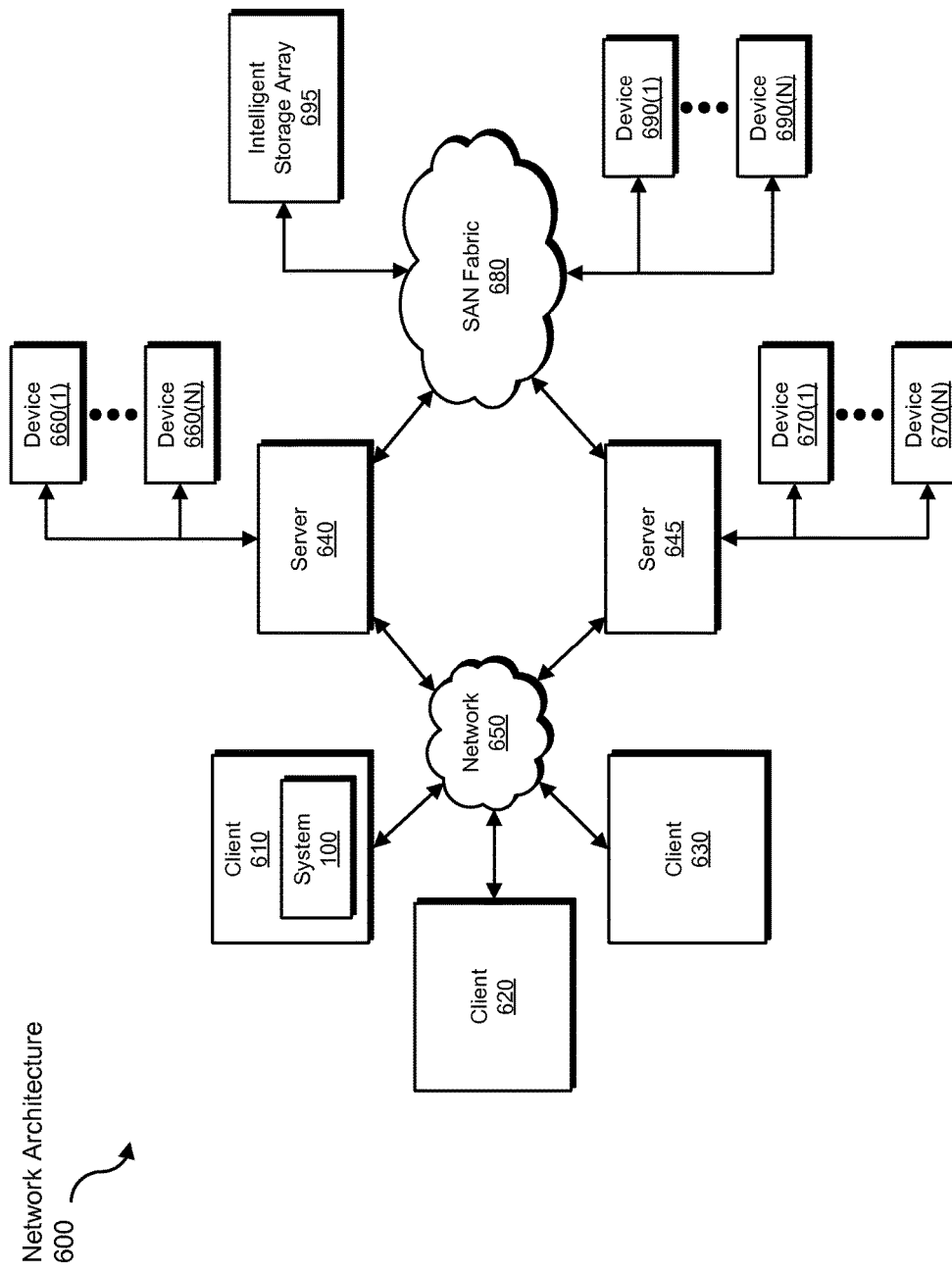
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, querying, determining, performing, configuring, alerting, and/or enhancing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for estimating ages of network devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a network packet to be transformed, transform the network packet into a MAC address and an OUI of the MAC address, output a result of the transformation to a database, use the result of the transformation to estimate the age of a device on a network, and store the result of the transformation to storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for estimating ages of network devices, at least a portion of the method being performed by a computing device comprising at least one processor, the method comprising:
   identifying at least one networked device that is attached to a network;
   identifying a media access control address of the networked device, the media access control address comprising an organizational unique identifier;
   querying an organizational-unique-identifier database with the organizational unique identifier and receiving, in response, device-age information relating to an estimated age of the networked device, wherein the device-age information is derived from an assignment date of the organizational unique identifier to an organization;
   determining the estimated age of the networked device by using the device-age information by positing that a creation of the networked device by the organization does not precede the assignment date of the organizational unique identifier to the organization and therefore limiting the estimated age of the networked device by the assignment date of the organizational unique identifier; and
   performing at least one of a security scan of the networked device and a compliance analysis of the networked device based at least in part on the estimated age of the networked device.

2. The computer-implemented method of claim 1, further comprising performing a security scan on the networked device based at least in part on the estimated age of the networked device.

3. The computer-implemented method of claim 1, further comprising:
   configuring a security scan of the networked device with an old-device rule based at least in part on the estimated age of the networked device;
   performing the security scan on the networked device.

4. The computer-implemented method of claim 1, further comprising:
   identifying a compliance policy to which the networked device is subject;
   determining that the networked device is not compliant with the compliance policy based at least in part on the estimated age of the networked device.

5. The computer-implemented method of claim 1, further comprising:
   determining, based on the estimated age of the networked device, that the networked device is due for replacement;
   alerting an administrator of the network that the networked device is due for replacement.

6. The computer-implemented method of claim 1, further comprising enhancing a network topology report of the network with the estimated age of the networked device.

7. The computer-implemented method of claim 1, wherein positing that the creation of the networked device does not precede the assignment date of the organizational unique identifier to the organization is based at least in part on an inference that the networked device did not exist earlier than the assignment date of the organizational unique identifier to the organization.

8. The computer-implemented method of claim 1, wherein limiting the estimated age of the networked device by the assignment date of the organizational unique identifier comprises estimating that the networked device was created a predefined period of time after the assignment date based on an estimated turnaround time between the organizational unique identifier being assigned to the organization and the organization making use of the organizational unique identifier for new devices.

9. A system for estimating ages of network devices, the system comprising:
   an identification module programmed to:
      identify at least one networked device that is attached to a network; and
      identify a media access control address of the networked device, the media access control address comprising an organizational unique identifier;
   a querying module programmed to query an organizational-unique-identifier database with the organizational unique identifier and receive, in response, device-age information relating to an estimated age of the networked device, wherein the device-age information is derived from an assignment date of the organizational unique identifier to an organization;
   a determination module programmed to determine the estimated age of the networked device by using the device-age information by positing that a creation of the networked device by the organization does not precede the assignment date of the organizational unique identifier to the organization and therefore limiting the estimated age of the networked device by the assignment date of the organizational unique identifier;
   an analysis module programmed to perform at least one of a security scan of the networked device and a compliance analysis of the networked device based at least in part on the estimated age of the networked device; and
   at least one hardware processor configured to execute the identification module, the querying module, the determination module, and the analysis module.

10. The system of claim 9, wherein the analysis module is programmed to perform a security scan on the networked device based at least in part on the estimated age of the networked device.

11. The system of claim 9, wherein the analysis module is programmed to:

configure a security scan of the networked device with an old-device rule based at least in part on the estimated age of the networked device;

perform the security scan on the networked device.

12. The system of claim 9, wherein the analysis module is programmed to:
   identify a compliance policy to which the networked device is subject;
   determine that the networked device is not compliant with the compliance policy based at least in part on the estimated age of the networked device.

13. The system of claim 9, wherein the analysis module is programmed to:
   determine, based on the estimated age of the networked device, that the networked device is due for replacement;
   alert an administrator of the network that the networked device is due for replacement.

14. The system of claim 9, wherein the analysis module is programmed to enhance a network topology report of the network with the estimated age of the networked device.

15. A non-transitory computer-readable-storage medium comprising one or more computer-readable instructions that, when executed by at least one processor of a computing device, cause the computing device to:
   identify at least one networked device that is attached to a network;
   identify a media access control address of the networked device, the media access control address comprising an organizational unique identifier;
   query an organizational-unique-identifier database with the organizational unique identifier and receiving, in response, device-age information relating to an estimated age of the networked device, wherein the device-age information is derived from an assignment date of the organizational unique identifier to an organization;
   determine the estimated age of the networked device by using the device-age information by positing that a creation of the networked device by the organization does not precede the assignment date of the organizational unique identifier to the organization and therefore limiting the estimated age of the networked device by the assignment date of the organizational unique identifier; and
   perform at least one of a security scan of the networked device and a compliance analysis of the networked device based at least in part on the estimated age of the networked device.

16. The non-transitory computer-readable-storage medium of claim 15, wherein the one or more computer-readable instructions further cause the computing device to perform a security scan on the networked device based at least in part on the estimated age of the networked device.

17. The non-transitory computer-readable-storage medium of claim 15, wherein the one or more computer-readable instructions further cause the computing device to:
   configure a security scan of the networked device with an old-device rule based at least in part on the estimated age of the networked device;
   perform the security scan on the networked device.

18. The non-transitory computer-readable-storage medium of claim 15, wherein the one or more computer-readable instructions further cause the computing device to:
   identify a compliance policy to which the networked device is subject;
   determine that the networked device is not compliant with the compliance policy based at least in part on the estimated age of the networked device.

* * * * *